United States Patent [19]

Kato

[11]  4,280,133

[45]  Jul. 21, 1981

[54] VIDEO SIGNAL PROCESSING CIRCUIT

[75] Inventor: Tetsuro Kato, Tokyo, Japan

[73] Assignee: Sony Corporation, Tokyo, Japan

[21] Appl. No.: 93,852

[22] Filed: Nov. 13, 1979

[30]  Foreign Application Priority Data

Nov. 14, 1978 [JP] Japan ............................... 53-140017

[51] Int. Cl.³ ......................................... H04N 5/783
[52] U.S. Cl. ........................................ 358/8; 358/127; 358/140; 358/160; 360/10
[58] Field of Search ................. 358/8, 21, 127, 137, 358/140, 160; 360/10, 11, 9

[56]  References Cited

U.S. PATENT DOCUMENTS 3,886,589  5/1975  Nasu ..................................... 360/11
3,919,716  11/1975  Yumde ................................. 360/10

*Primary Examiner*—Robert L. Griffin
*Assistant Examiner*—Michael A. Masinick
*Attorney, Agent, or Firm*—Lewis H. Eslinger; Alvin Sindebrand

[57]  ABSTRACT

A video signal processing circuit particularly suited for eliminating undesirable picture vibration in the stop-motion, or slow-motion mode of a video reproducing apparatus includes a source of a video signal, a delay line for delaying the video signal one line interval and thereby providing a delayed version of the video signal, a switching circuit connected with the source of the video signal and with the delay line for alternately applying the video signal and the delay version thereof to an output, and a control circuit connected to the switching circuit for causing the switching circuit to switch over at a sampling rate which is sufficient to sample the video signal a plurality of times during each line interval. One embodiment of the video signal processing circuit is adapted to process a digitized composite color video signal formed of digital words each composed of a predetermined number of bits which are processed in parallel form, and the sampling rate at which the switching circuit is switched over is identical with the rate at which the digital words are provided at the source of the video signal.

19 Claims, 7 Drawing Figures

VIDEO SIGNAL PROCESSING CIRCUIT

BACKGROUND OF THE INVENTION

This invention relates generally to a video signal processing circuit and, in particular, is directed to a video signal processing circuit which mixes the information in successive lines of a video signal.

Commercial television systems use an interlaced scanning system consisting of frames each having a first, or odd field which reproduces alternate lines of the frame and a second, or even field interlaced with the first field and which reproduces the remaining lines of the frame. Each field consists of parallel television lines, the first of which begins in the upper left corner of the television screen and the last of which ends in the middle of the bottom of the screen. Each even field consists of parallel television lines interlaced between the lines of the odd field, and the first of which begins in the middle of the top of the television screen while the last line ends at the lower right corner of the television screen. The video at a point in a line from an even field, for example, contains video information which reproduces a part of the picture occurring just above or just below a corresponding point on the next adjacent line from the next successive odd field. The vertical distance between such corresponding points is one-half pitch, or one-half the center-to-center distance between adjacent lines of a field (which is equal to the vertical center-to-center distance between adjacent interlaced lines).

When the frames of the recorded video signals are reproduced out of their normal sequence, such as during a stop-motion, slow-motion, fast-motion, or reverse operation, an odd field will often be reproduced when an even field is expected, and vice-versa. Furthermore, when only even fields or only odd fields of the video signal are reproduced, or when a single field is repeatedly reproduced by a reproducing device from a video tape, a video sheet, or a video disc, direct use cannot be made of the reproduced synchronizing pulses since the video signal lacks the necessary relationship between vertical and horizontal synchronizing pulses for producing interlaced scanning. A locally generated synchronizing signal having the necessary relationships between horizontal (line) and vertical (field) synchronizing pulses is normally produced in the reproducing apparatus, and is substituted during reproduction for the corresponding recorded synchronizing pulses. The use of a locally-generated synchronizing signal, when a field is reproduced repeatedly, will result in the video signal being displayed on the television screen, and then being again displayed but shifted up or down by an amount corresponding to one-half a pitch. Accordingly, the reproduced picture appears to vibrate annoyingly up and down on the screen, even though the interlaced raster is itself stationary.

The shifting process described above occurs when processing either a monochrome television signal or a composite color television signal, but an additional problem arises when processing an NTSC composite color television signal by reason of the fact that the phase of the chrominance component in the NTSC composite color television signal has a specific and changing relationship from line to line, field to field, and frame to frame. Specifically, the phase of the color subcarrier is reversed from line to line and from field to field. The locally-generated synchronizing signal may contain a color burst signal having the correct changing phase relationship to the successive frames and fields for correctly demodulating a color signal in the normal reproducing mode. Nevertheless, when the same field is scanned repeatedly, as in the stop-motion mode, the phase of the reproduced chrominance signal will not always be in the relationship required by the NTSC system, and a correct color image cannot be reproduced. The above requirement of the changing relationship of phase is especially important when reproducing a composite color television signal for broadcasting.

One approach to solving the problem set forth above is disclosed in copending patent application Ser. No. 28,597, filed Apr. 9, 1979, and having a common assignee herewith. The signal processing circuit according to that copending application generates a reference synchronizing signal operative to define the various types of reference television fields (i.e., odd and even, and with reversed or unreversed color subcarrier phase) in a predetermined repeating order, and detects non-coincidence between at least one characteristic of the reproduced television field and one of the types of reference television fields. Reproduced video signals of two successive lines are mixed together to produce an interpolated signal and, if non-coincidence of the reproduced line synchronizing signal with the reference line synchronizing signal is detected, the interpolated television signal is applied to an output of the processing circuit. On the other hand, if coincidence of the reproduced with the reference line synchronizing signal is detected, the reproduced (i.e., uninterpolated) television signal is applied to the output of the processing circuit.

Such a video signal processing circuit performs satisfactory in many applications. However, its application is somewhat constrained when used with digitized video signals, such as those provided in a digital time base corrector, or those provided when a recorded digitized video signal is reproduced. If digitized video signals are to be processed in the above described video signal processing circuit, it is necessary that the circuitry for mixing together the two successive lines of the video signal be a digital adding circuit, and such digital adding circuits are normally quite complex. Furthermore, because such a video signal processing circuit requires interpolated and uninterpolated digitized video signals to be applied selectively to provide an output video signal having the proper sequence of frame types, a switch must be provided in addition to the digital adding circuit so as to further increase the circuit complexity.

OBJECTS AND SUMMARY OF THE INVENTION

An object of this invention is to provide a novel video signal processing circuit which avoids previously mentioned problems inherent in the previously proposed devices.

Another object of this invention is to provide a video signal processing circuit for a reproducing apparatus which permits operation in various reproducing modes, such as slow motion, still or stop motion, fast motion, and reverse, without vertical shift of the displayed video picture or image from field to field.

Still another object of this invention is to provide a video signal processing circuit which facilitates interlaced scanning.

A further object of this invention is to provide a video signal processing circuit which may be used in conjunction with a video-sheet, video-disc, or helically-scanned video-tape reproducing apparatus.

A still further object of this invention is to provide a video signal processing circuit which may be used with a reproducing apparatus employing a time base corrector.

A yet further object of this invention is to provide a video signal processing circuit which can process a digitized video signal and which will eliminate vertical shift of the digitized video from field to field when a single field of said digitized video is repeatedly displayed.

According to one aspect of this invention, a circuit for processing a video signal made up of field intervals each having a plurality of horizontal line intervals, comprises a source of the video signal; a processed video output terminal; a delay line connected with the source for delaying the video signal for a horizontal line interval, thereby providing a delayed version of the video signal; a switch connected with the source and with the delay line for alternately applying the undelayed video signal and the delayed version thereof to the processed video signal output terminal; and a signal generating circuit for providing a sampling signal to the switch to cause the latter to switch or change over at a sampling rate sufficient to sample the video signal at least several times during each line interval.

In a preferred version of the above video signal processing circuit according to the invention, and wherein the video signal is a digitized video signal formed of digital words each composed of a predetermined number of bits, the delay line and the switch are adapted to process the digital words in parallel form, and the sampling rate at which the switch is switched over is the same as the rate at which the digital words are provided at the source. As a result, the processed video signal is an interpolated signal in which alternate digital words of one line are interleaved with the remaining alternate words of a next successive line. The processing circuit can also include a logic circuit to control the switching over of the switch, so that if a field of one parity (odd or even) is provided at the source when a field of the complementary parity (even or odd) is to be reproduced or displayed, the switch will be permitted to switch over at the sampling rate; whereas, if the field provided at the source and the field to be reproduced or displayed have the same parity, change-over of the switch will be inhibited.

The above, and further objects, features, and advantages of the present invention will become apparent from the following detailed description which is to be read in conjunction with the accompanying drawings.

DETAILED DESCRIPTION OF THE PREFERRED EMBODIMENTS

Figure 1:
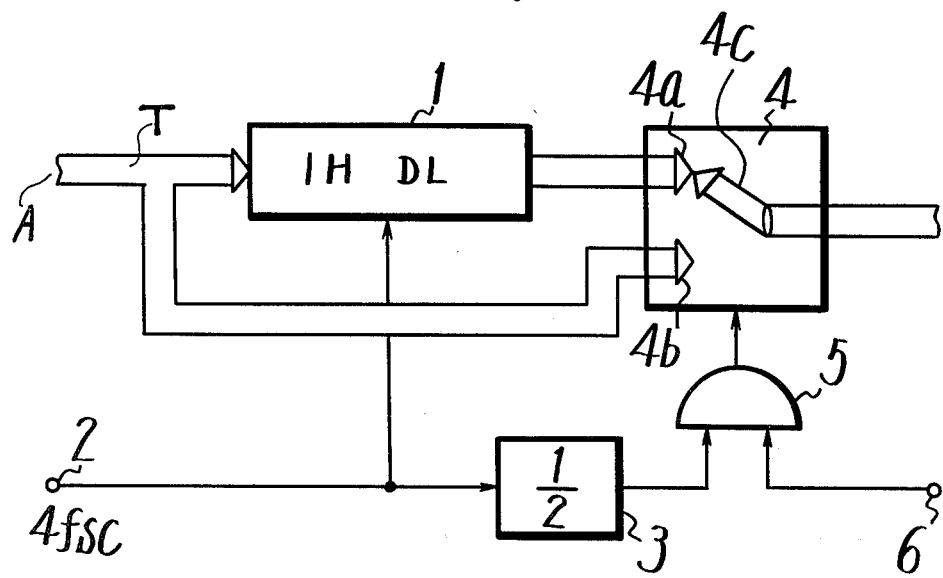
FIG. 1 is a block circuit diagram showing a video signal processing circuit according to an embodiment of the present invention.

As mentioned above, and as discussed in greater detail in the copending application Ser. No. 28,597, a composite NTSC color video signal is formed of fields of four types, as set forth in the following table.

| $F_1$ | odd parity | unreversed chrominance |
| --- | --- | --- |
| $F_2$ | even parity | reversed chrominance |
| $F_3$ | odd parity | reversed chrominance |
| $F_4$ | even parity | unreversed chrominance |

The NTSC system uses an interlaced scanning system of successive frames which, in a cyclically repeating order, have a first, or odd-parity field made up of alternate lines of each frame and a second, or even-parity field interlaced with the first field and which is made up of the remaining lines of the frame. While each of the lines in the odd and even-parity fields contains a line synchronizing signal, direct use cannot always be made of the reproduced synchronizing signal. For instance, if an odd-parity field is reproduced when an even-parity field is expected, the reproduced line synchronizing pulses will occur at the center, rather than at the end of the line intervals expected for the even-parity field. For that reason, a locally generated ("off-tape" or reference) synchronizing signal having the necessary relationship of horizontal to vertical synchronizing pulses is provided in the reproducing apparatus and such signal is substituted during reproduction for the corresponding recorded synchronizing pulses.

Further, as indicated in the above table, the phase of a chrominance component in the composite color television signal according to the NTSC system has a specific and changing relationship from line to line, field to field, and frame to frame. Specifically, the phase of the color subcarrier is reversed from line to line and from field to field. To wit, in the four cyclically-repeating color fields $F_1$–$F_4$, the phase of the chrominance subcarrier in color field $F_1$ is the same as that in color field $F_4$, while the phase of the color subcarrier signal in field $F_2$ is the same as that in color field $F_3$. The phases of the chrominance subcarrier signal in the two fields constituting a single frame, $F_1$ and $F_2$, or $F_3$ and $F_4$, are reversed with respect to each other.

If a recorded NTSC color video signal is reproduced at normal speed, the color fields are reproduced in their proper order, that is, $F_1$, $F_2$, $F_3$, $F_4$, $F_1$ . . . etc. However, if the recorded video signal is reproduced in a slow-motion or stop-motion mode, an odd or even parity field will be repeatedly reproduced, and it is necessary to substitute such field for the field of the other parity. For example, if the reproducing apparatus is set in a slow-motion mode so as to play the recorded video signal at 50% normal speed, the fields will be produced in the order $F_1$, $F_1$, $F_2$, $F_2$, $F_3$, $F_3$, . . . etc. If the apparatus is set into a stop-motion mode, the same field will be played repeatedly, for example, in the order $F_1$, $F_1$, $F_1$, $F_1$, etc. If the apparatus is set into a fast-motion mode where the reproduced signal is played at 200% normal speed, the reproduced signal will consist only of odd or only of even-parity fields, for example, the fields $F_1$, $F_3$, $F_1$, $F_3$, $F_1$, . . . etc.

If the apparatus is set into a reverse mode, the recorded fields will be reproduced in the order $F_1$, $F_4$, $F_3$, $F_2$. While such a reverse mode results in alternation of odd- and even-parity fields, $F_1$, $F_4$, $F_3$, $F_2$, $F_1$, etc., the phase of the chrominance subcarrier will be the same, rather than reversed, for consecutive fields in the same apparent frame, i.e., $F_1$ and $F_4$, or $F_3$ and $F_2$.

During reproduction of a recorded video signal at other than normal speed, video fields of one parity being produced when video fields of another parity are expected can yield a video picture which appears to vibrate up and down annoyingly at the frame rate (30 Hz in the NTSC system). In order to eliminate such undesirable vibration, an interpolating circuit must be used to interpolate, or average successive lines in each of the reproduced fields of one parity which are to be substituted for the reproduced fields of the other parity.

With reference to the drawings, FIG. 1 shows a video signal processing circuit which accomplishes the interpolation necessary to eliminate the above-mentioned undesirable vibration. As shown therein, a video signal is provided at an input A, which serves as a source of the video signal. In the illustrated embodiment, the video signal is a digitized video signal, and each line of the digitized video signal is constituted by a number of 8-bit digital words. A transmission path T is provided for carrying the 8-bit words in parallel form. A delay line 1, which can be an 8-bit-wide sequencing register or a bucket-brigade device, serves to delay the digitized video signal provided from input A by one line interval.

A clock terminal input 2 receives a clock signal (FIG. 2A) having a frequency which is normally four times the color subcarrier frequency $f_{sc}$. The frequency of the clock signal (FIG. 2A) is identical with the rate at which the digital words are provided at the input A and also corresponds to the sampling rate at which analog video signals are sampled to form the digitized video. The clock signals are provided to the delay line 1 to control the sequencing thereof, and are also provided to a divide-by-two counter 3 providing a switching signal at a rate which is twice the color subcarrier frequency, $2f_{sc}$ (FIG. 2B). A switching circuit 4 has an input terminal 4a thereof connected to delay line 1 and another input terminal 4b connected to input A. Thus, the terminal 4b receives undelayed words V of the digitized video signal (FIG. 2C), while the other input 4a receives delayed words DV of the digitized video signal (FIG. 2D). The switching speeds required for processing a digitized video signal would require an electronic switch, however, for purposes of simplicity, the switch 4 is here depicted symbolically as a moving-contact switch.

Figure 2A:
FIGS. 2A–2E show the relative timing of various signals applied to the video signal processing circuit of FIG. 1.
Figure 2B:
Figure 2C:
Figure 2D:
Figure 2E:

In FIGS. 2C-2E, each block indicated by V or DV represents an 8-bit digital word corresponding to the video signal as sampled at the time of a clock pulse (FIG. 2A). In the digital video signal processing circuit, the switching signals (FIG. 2B) are applied to one input of an AND gate 5, and an interpolating control signal is applied to a control signal terminal 6 and thence to another input of AND gate 5. An output of AND gate 5 is connected to the switch 4 for controlling the switching or change-over thereof. At the output of switch 4 there is obtained a processed video signal. Whenever it is necessary to substitute an odd-parity field for an even-parity field, or vice-versa, a high or logic "1" signal is applied as the interpolating control signal to AND gate 5, and the switching signal $2f_{sc}$ (FIG. 2B) is applied from divider 3 through AND gate 5 to switch 4 to cause the latter to switch over between the input terminals 4a and 4b at the sampling or clock rate $4f_{sc}$. As a result, the processed video signal at the output of switch 4 is an interpolated signal as shown in FIG. 2E and in which delayed and undelayed digital words DV, V are interleaved with one another. When the parity of a field of the digitized video signal is the same as that which is expected, a low or logic "0" signal is applied as the interpolating control signal to AND gate 5 and, as a result, switch 4 is not switched over and remains connected to input terminal 4b. Consequently, only the undelayed words V of FIG. 2C are applied to the output of switch 4.

It is apparent that the interpolated video signal of FIG. 2E is equivalent to that which would be obtained by adding together, and thereby averaging, the signals of FIGS. 2C and 2D. Thus, the video signal processing circuit according to the present invention is able to furnish a video signal which will prevent undesirable picture vibration, but which does not require the relatively complex circuitry associated with a digital adder.

Figure 3:
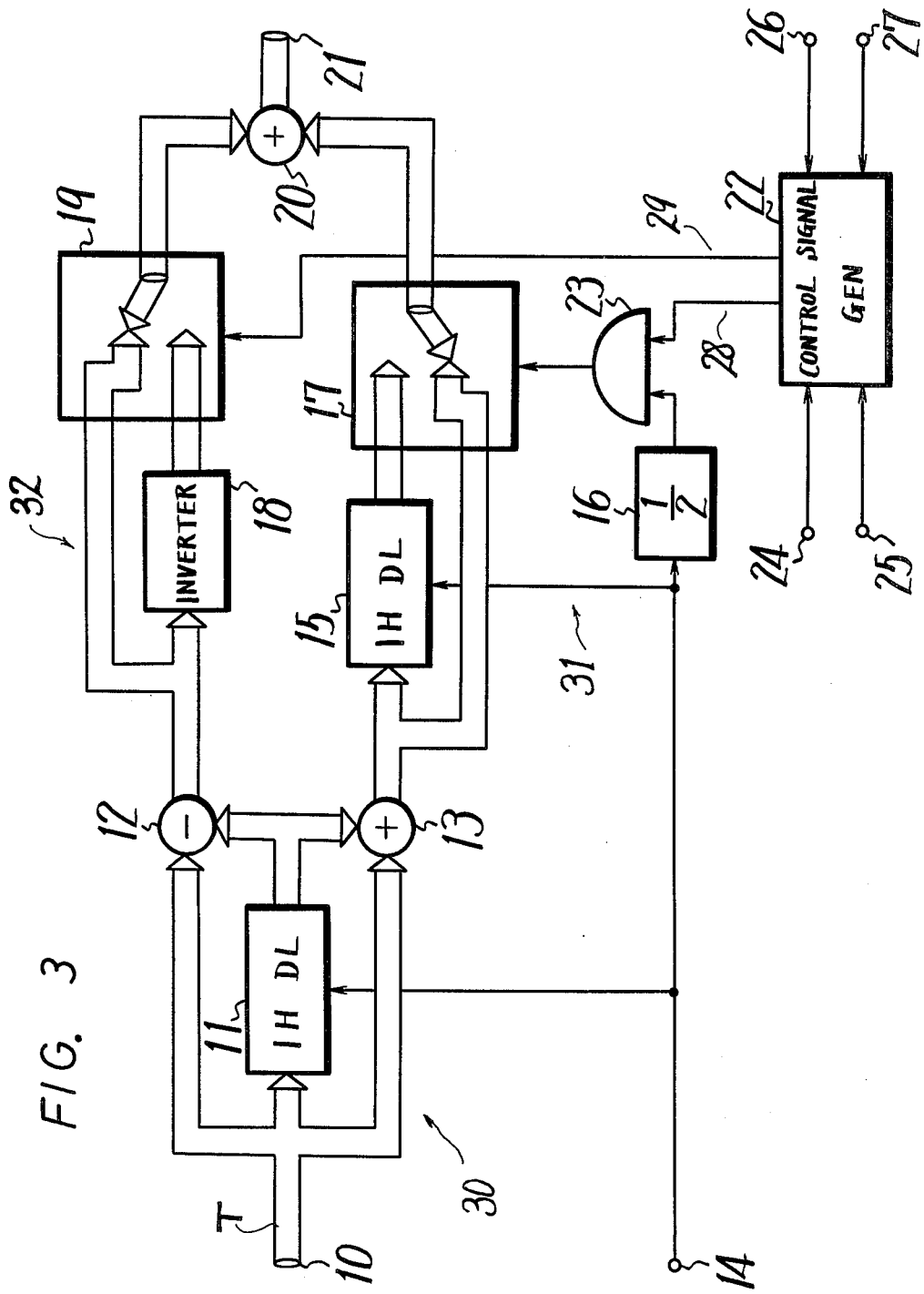
FIG. 3 is a block circuit diagram of a circuit for processing a digitized composite color television signal according to another embodiment of the present invention.

FIG. 3 shows a video signal processing circuit for processing an 8-bit-wide digitized color video signal in which each line interval contains a composite color video signal formed of a chrominance component and a luminance component. In the circuit shown in FIG. 3, an input terminal 10 is connected to receive the digitized composite color video signal. Such a signal can be provided, for instance, from a digital time base corrector, such as that shown in U.S. Pat. No. 4,145,705, granted Mar. 20, 1979, and having a common assignee herewith, or can be provided by direct reproduction of recorded digitized color television signals. The digitized composite color television signals are provided along a transmission path T to a digital comb filter circuit 30 formed of a one-line delay line 11, a subtractor 12, and an adder 13. Digitized video signals are applied directly from input 10 to an input of each of the subtractor 12 and adder 13, and a delayed version of the digitized video signal, delayed by one line, is applied from delay line 11 to another terminal of each of the subtractor 12 and adder 13. The comb filter circuit 30 functions as a separator circuit and provides the chrominance component and the luminance component of the digitized composite video signal at outputs of subtractor 12 and adder 13, respectively. In the embodiment shown in FIG. 3, the adder 13 acts as the source of the video signal which is acted upon by the signal processing circuit according to the present invention.

A sampling, or clock signal is applied at a sampling signal input terminal 14, and is applied from there to the delay line 11 to control the sequencing thereof. The digitized luminance signal is provided from adder 13 to a luminance signal interpolating stage 31, which, as noted above, corresponds to the circuitry shown in FIG. 1. The digitized luminance component is applied to an input of a one-line delay line 15, and to one terminal of a switching circuit 17. An output of delay line 15 is applied to another input of switching circuit 17. The clock signal (FIG. 2A) is also applied to delay line 15 to control the sequencing thereof, and is further applied to a divide-by-two-counter 16 so that the latter can provide a switch control signal (FIG. 2B) to one input of an AND gate 23.

A chrominance channel 32 is provided to receive and process the digitized chrominance component as furnished by the subtractor 12. This chrominance channel 32 includes a phase inverter 18 and a switching circuit 19. The switching circuit 19 alternately applies the separated digitized chrominance component from subtractor 12, and a phase-inverted version thereof from phase inverter 18, to a processed video signal output circuit including an adder or mixing circuit 20 and an output terminal 21. In the adder 20, the processed chrominance component from switch 19 is combined with the luminance signal provided from interpolating stage 31 to form a processed composite color video signal.

A control signal generator 22 is provided to control the switching over of switching circuits 17 and 19. In the control signal generator 22, a first input 24 receives the chrominance subcarrier of the reproduced signal and a second input 26 receives the line synchronizing signal of the reproduced video signal. A third input 25 of signal generator 22 receives a reference, or off-tape chrominance subcarrier and a fourth input 27 receives a reference, or off-tape line synchronizing signal. The control signal generator 22 suitably provides at an interpolating command signal output 28 thereof, an interpolation command signal which is high or logic "1" when the line synchronizing signal of the reproduced video signal is non-coincident with the off-tape line synchronizing signal, but which is low, or logic "0" if there is coincidence between the reproduced and off-tape line synchronizing signals. Such interpolating command signal is applied to another input terminal of AND gate 23, which has its output coupled with a control terminal of switching circuit 17. At another output 29, control signal generator 22 suitably provides a chrominance phase inverting signal, which is low or logic "0" when the chrominance subcarrier of the reproduced signal has the same phase as (that is, is aligned in phase with) the off-tape chrominance subcarrier, but which is high or logic "1" when the reproduced and off-tape chrominance subcarrier have opposite (non-aligned) phases. Such chrominance phase inverting signal is applied from output 29 to switching circuit 19.

If, for instance, an odd-parity field is reproduced when an even-parity field is expected, the reproduced and off-tape line synchronizing signals will be non-coincident, the interpolating command signal will be "1", and the switching signals (FIG. 2B) will pass through AND gate 23 to cause switching circuit 17 to switch over, and thereby provide an interpolated digitized luminance component to the combining circuit 20. However, if an even-parity field is reproduced when an even-parity field is expected, the line synchronizing signals applied to terminals 26 and 27 of control signal generator 22 will be coincident with each other, the interpolating command signal will be "0", and switch 17 will not be switched over. As a result, the digitized luminance component is applied directly from the adder 13 through switch 17 to combining circuit 20.

If the chrominance subcarrier of the reproduced video signal is in phase with the off-tape chrominance subcarrier, the switch 19 will be connected so as to pass the digitized chrominance component from subtractor 12 directly to combining circuit 20. However, if the reproduced and off-tape chrominance subcarriers are opposite in phase, switch 19 will be switched over so as to pass a phase-inverted version of the chrominance component to combining circuit 20.

Therefore, the circuitry depicted in FIG. 3 serves both to convert a reproduced digitized composite video signal to a form which is compatible with NTSC standards, and also to avoid the objectionable up-and-down vibration in the reproduced picture which is normally associated with the selection of a slow-motion, stop-motion, or fast-motion mode of reproduction.

Under most circumstances, interpolation of the luminance component alone is sufficient to remove the objectionable up-and-down vibration of the reproduced picture. However, if desired, an even better reproduced picture may be obtained by including in chrominance channel 32 a further interpolating stage (not shown) according to this invention which is similar to stage 31. If desired, such an interpolating stage could be included in the circuitry depicted in FIG. 3, either between subtractor 12 and phase inverter 18, or between switch 19 and combining circuit 20.

Further, it will be appreciated that the circuitry according to the present invention has a broader use than merely its application to NTSC color video signals, and that it can be applied to the processing of a monochrome (black-and-white) video signal or other color video signals, such as PAL signals.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A video signal processing circuit for processing a video signal comprised of field intervals each having a plurality of line intervals, said processing circuit comprising:
   a video signal input for said video signal;
   delay means connected with said input for delaying said video signal for a duration of a predetermined number of said line intervals, thereby providing a delayed version of said video signal;
   switching means connected with said input and said delay means for alternately applying said video signal and said delayed version thereof to an output terminal of the processing circuit; and
   means for causing said switching means to switch at a sampling rate sufficient to supply samples of said video signal and the delayed version thereof a plurality of times during each said line interval.

2. A video signal processing circuit according to claim 1, wherein said switching means has an output coupled to said output terminal of the processing circuit and first and second inputs coupled to said video signal input and said delay means to receive said video signal and said delayed version thereof, respectively, and said switching means is operative to connect said output thereof alternately to said first and said second inputs thereof.

3. A video signal processing circuit according to claim 1, further comprising a sampling signal input terminal to receive a sampling signal; and means providing a switching signal of a first state for causing said switching means to apply said video signal to said output means and a switching signal of a second state for causing said switching means to apply said delayed version of the video signal to said output terminal, said means for providing the switching signal being responsive to said sampling signal to alternate, at said sampling rate, between said switching signals of said first and second states.

4. A video signal processing circuit according to claim 3, wherein said means for providing the switching signal includes a divide-by-two frequency divider coupled between said sampling signal input terminal and said switching means.

5. A video signal processing circuit according to claim 3, wherein said means for providing the switching signal includes logic means for controlling the switching of said switching means in accordance with a control signal applied to said logic means.

6. A video signal processing circuit according to claim 5, wherein said video signal is a digitized video signal formed of digital words each composed of a predetermined plurality of bits, said delay means and said switching means are adapted to process the bits of said digital words in parallel form, and the sampling rate of said sampling signal is identical with the rate of which said digital words are provided at said video signal input.

7. A video signal processing circuit according to claim 6, wherein said delay means includes a sequencing register to which said digital words are applied and from which said digital words are derived at a time delayed thereafter, and said sampling signal is applied to said register to control the sequencing thereof.

8. A video signal processing circuit according to claim 1, wherein said video signal is a digitized video signal formed of digital words each composed of a predetermined plurality of bits, and said delay means and said switching means are adapted to process the bits of each of said digital words in parallel form.

9. A video signal processing circuit according to claim 1, wherein said video signal input includes filter means receiving a composite television signal comprising luminance and chrominance components and operative to separate said components from each other, and said video signal is constituted by the separated luminance component.

10. A video signal processing circuit according to claim 9, further comprising phase inverting means connected with said filter means for receiving the separated chrominance component therefrom and thereby providing a phase-inverted version of the chrominance component; additional switching means connected with said filter means and with said phase inverter means for selectively applying said chrominance component and said phase-inverted version thereof to said output terminal of the processing circuit to be combined with the processed separated luminance component; and means for controlling said additional switching means to selectively apply said chrominance component and said phase-inverted version thereof in accordance with the relation of the phase of said chrominance component to the phase of a reference signal.

11. A video signal processing circuit for processing a composite color video signal consisting of at least one field interval having a plurality of line intervals each containing a line synchronizing signal, said at least one field interval being either of an odd or an even type, said composite color video signal in each said line interval being formed of a chrominance component and a luminance component, said video signal processing circuit comprising:
 a video input for said composite color video signal;
 separating means for separating said chrominance component and said luminance component;
 means acting on said chrominance component and applying the latter to an output terminal of the video processing circuit;
 delay means for delaying said luminance component for a duration of a predetermined number of said line intervals, thereby providing a delayed version of said luminance component;
 switching means for alternately applying said luminance component and said delayed version thereof to said output terminal to be combined with said chrominance component; and
 means for causing said switching means to switch at a sampling rate sufficient to supply samples of said luminance component and the delayed version thereof a plurality of times during each said line interval.

12. A video signal processing circuit according to claim 11, wherein said separating means includes a digital comb filter having a delay line with an input thereof connected to receive said composite color video signal and an output from which a delayed version of said composite color video signal is provided, subtractive combining means for subtractively combining said composite color television signal with said delayed version thereof to form said chrominance component, and additive combining means for additively combining said composite color television signal with said delayed version thereof to from said luminance component.

13. A video signal processing circuit according to claim 11, wherein said means acting on said chrominance component includes phase-inverting means connected with said separating means for receiving said separated chrominance component therefrom and thereby providing a phase-inverted version of said separated chrominance component; additional switching means connected with said separating means and with said phase inverting means for selectively applying said separated chrominance component and said phase-inverted version thereof to said processed output terminal; and means for controlling said additional switching means to selectively apply said chrominance component and said phase-inverted version thereof in accordance with the relation of the phase of said chrominance component to the phase of a reference signal.

14. A video signal processing circuit according to claim 13, wherein said means for controlling said additional switching means includes command signal generator means, responsive to the phase of said chrominance component and to the phase of said reference signal, for furnishing to said additional switching means a phase-inverting command signal having a first state when the phase of said chrominance component and the phase of said reference signal are aligned, and having a second state when the phase of said chrominance component and the phase of said reference signal are non-aligned.

15. A video signal processing circuit according to claim 11, wherein said means for causing said switching means to switch includes a sampling signal input terminal to receive a sampling signal; and means providing a switching signal of a first state for causing said switching means to apply said luminance component to said output means and a switching signal of a second state for causing said switching means to apply said delayed version of the luminance component to said output terminal, said means for providing the switching signal being responsive to said sampling signal to alternate, at said sampling rate, between said switching signals of said first and second states.

16. A video signal processing circuit according to claim 15, wherein said means for providing the switching signal includes a divide-by-two frequency divider coupled between said sampling signal input terminal and said switching means.

17. A video signal processing circuit according to claim 15, wherein said means for providing the switching signal includes logic means for controlling the switching of said switching means in accordance with an interpolating command signal applied to said logic means.

18. A video signal processing circuit according to claim 17, wherein said means for providing the switching signal further includes interpolating command signal generator means for generating said interpolating command signal in accordance with the relative times of occurrence of said line synchronizing signal and a reference synchronizing signal.

19. A video signal processing circuit according to claim 18, wherein said interpolating command signal generator provides an interpolating command signal of a first sense when said line synchronizing signal and said reference synchronizing signal are coincident, and provides an interpolating command signal of a second sense when said line synchronizing signal and said reference synchronizing signal are non-coincident, said logic means being operative to inhibit the switching of said switching means in response to said interpolating command signal of said first sense and being operative to permit such switching in response to said interpolating command signal of said second sense.

* * * * *